United States Patent
Yao et al.

(10) Patent No.: US 12,010,538 B2
(45) Date of Patent: Jun. 11, 2024

(54) METHOD AND APPARATUS TO SUPPORT PERFORMANCE DATA STREAMING END-TO-END (E2E) PROCEDURES

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 284 days.

(21) Appl. No.: 17/173,925

(22) Filed: Feb. 11, 2021

(65) Prior Publication Data

US 2021/0219162 A1    Jul. 15, 2021

Related U.S. Application Data

(60) Provisional application No. 62/975,147, filed on Feb. 11, 2020.

(51) Int. Cl.
*H04W 24/10*  (2009.01)
*H04W 24/08*  (2009.01)
*H04W 76/32*  (2018.01)

(52) U.S. Cl.
CPC .......... *H04W 24/10* (2013.01); *H04W 24/08* (2013.01); *H04W 76/32* (2018.02)

(58) Field of Classification Search
None
See application file for complete search history.

(56) References Cited

U.S. PATENT DOCUMENTS

| | | | | |
|---|---|---|---|---|
| 2011/0046874 A1* | 2/2011 | Wirola | ............ | H04W 4/02 |
| | | | | 701/532 |
| 2021/0112478 A1* | 4/2021 | Dannebro | ............ | H04W 4/50 |
| 2023/0128998 A1* | 4/2023 | Ping | ............ | H04L 63/1433 |
| | | | | 726/25 |

FOREIGN PATENT DOCUMENTS

| | | | | | |
|---|---|---|---|---|---|
| CN | 112584398 | * | 9/2019 | ............ | H04W 24/02 |
| EP | 3783973 A1 | * | 2/2021 | ............ | G01S 5/02 |

OTHER PUBLICATIONS

"3GPP TS 28.550 V16.7.0", 3rd Generation Partnership Project; Technical Specification Group Services and System Aspects; Management and orchestration; Performance assurance(Release 16), (Dec. 2012), 4 pgs.

(Continued)

*Primary Examiner* — Chi H Pham
*Assistant Examiner* — Raul Rivas
(74) *Attorney, Agent, or Firm* — Schwegman Lundberg & Woessner, P.A.

(57) ABSTRACT

Systems and methods of providing performance data streaming procedures are described. A MnS producer for measurement control receives a request to start or stop measurement collection indicating the measurements are reported by streaming, configures a NF to respectively start or stop collection of measurements and provides an indication of a result of starting or stopping the measurement collection. A MnS producer for performance data streaming, in response to reception of a request to set up streaming information sends a request to establish, add, or update a streaming connection for performance data streaming and receives an indication of a result of the request. In response to reception of a request to terminate the streaming, the MnS producer for performance data sends a request to terminate the streaming connection, or delete or update the stream infor- (Continued)

mation dependent on the functionality of the connection and the streams of the connection.

20 Claims, 10 Drawing Sheets

(56) References Cited

OTHER PUBLICATIONS

"3GPP TS 28.533 V16.6.0", 3rd Generation Partnership Project; Technical Specification Group Services and System Aspects; Management and orchestration; Architecture framework(Release 16), (Dec. 2020), 4 pgs.

\* cited by examiner

METHOD AND APPARATUS TO SUPPORT PERFORMANCE DATA STREAMING END-TO-END (E2E) PROCEDURES

PRIORITY CLAIM

This application claims the benefit of priority under 35 U.S.C. 119(e) to U.S. Provisional Patent Application Ser. No. 62/975,147, filed Feb. 11, 2020, which is incorporated herein by reference in its entirety.

TECHNICAL FIELD

Embodiments pertain to radio access networks. Some embodiments relate to Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to end-to-end (E2E) performance data streaming for 5G networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)) systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed herein.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
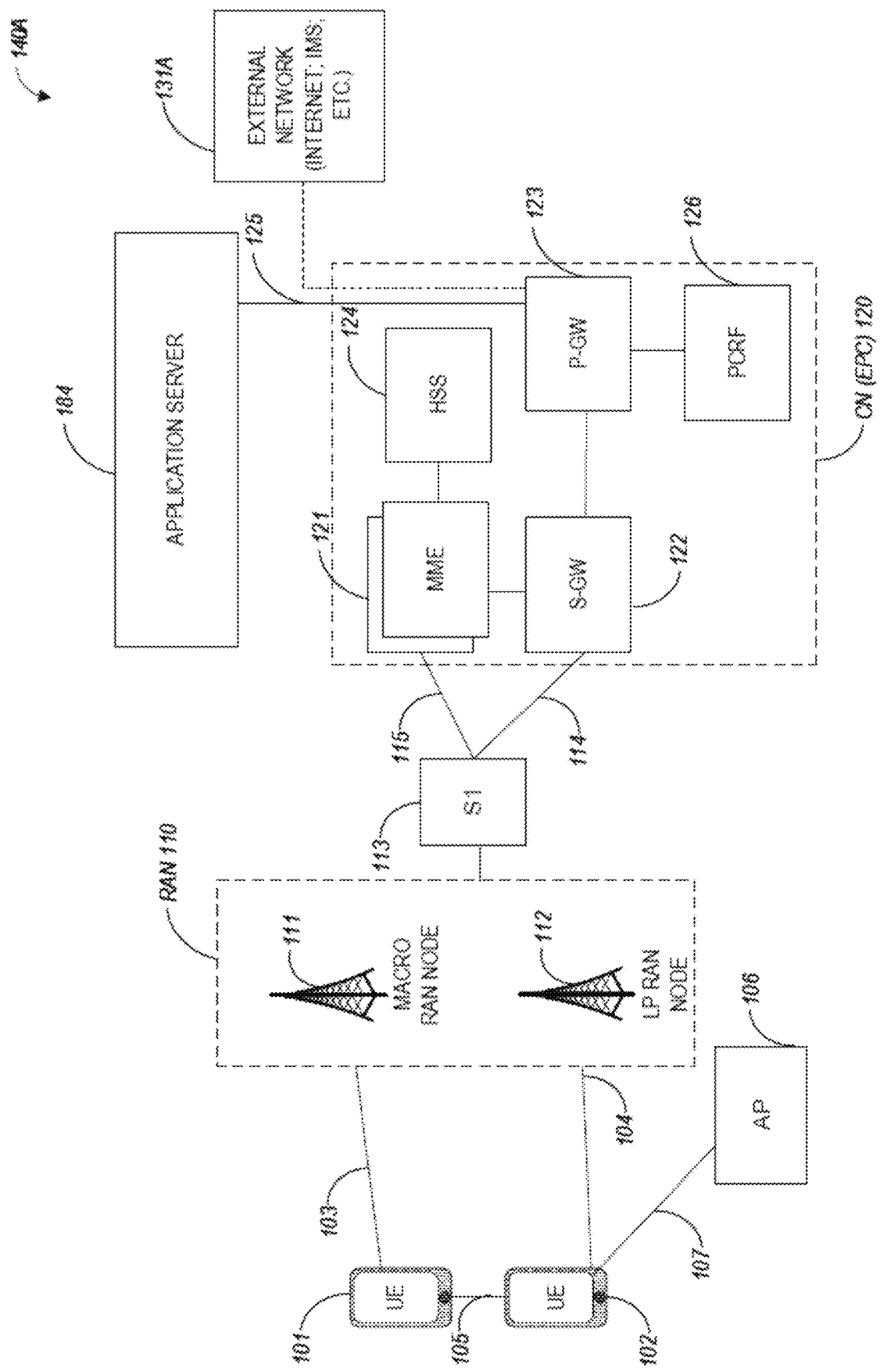
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
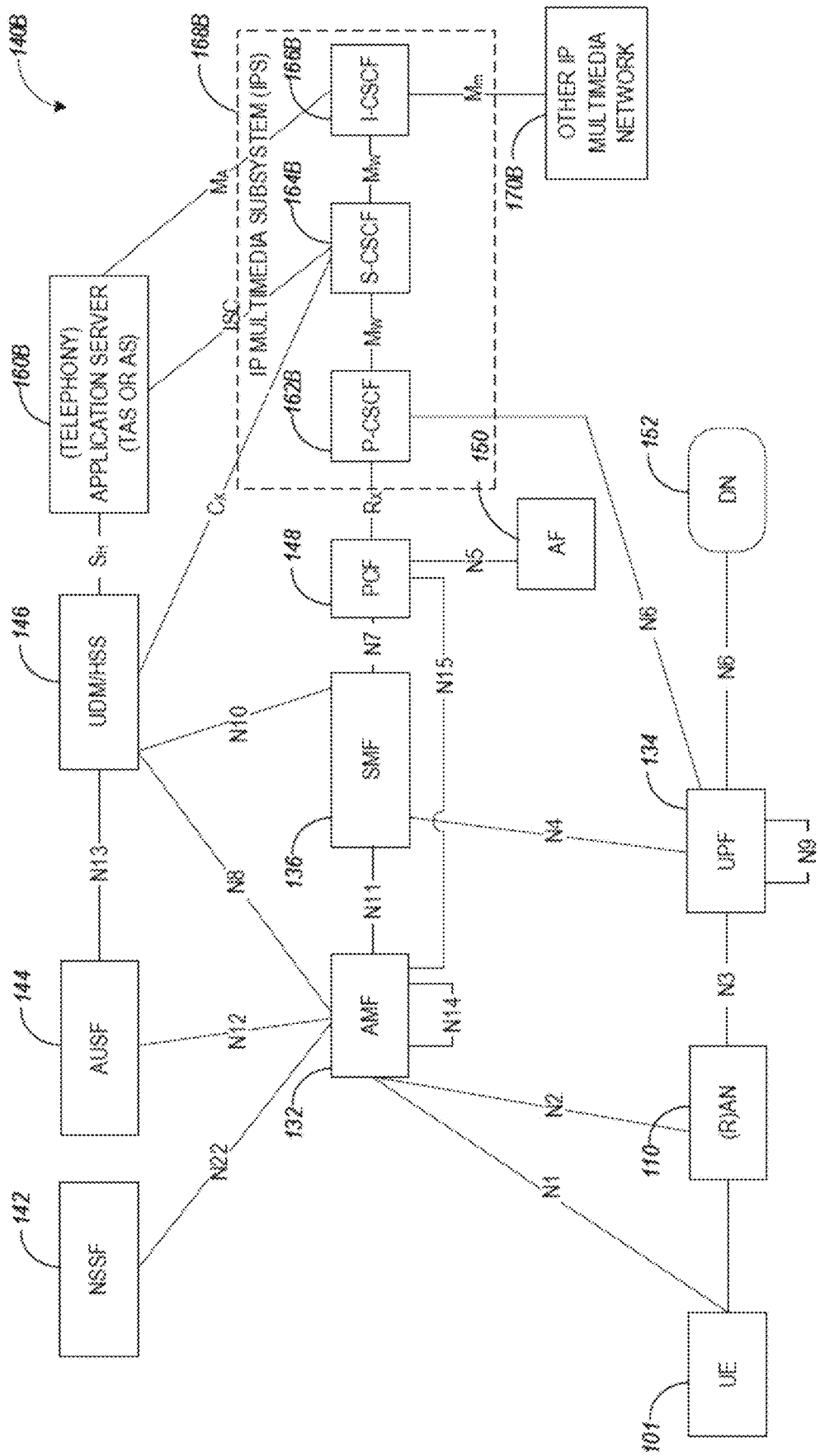
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 16B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134). N4 (between the SMF 136 and the UPF 134), N5 (between the PCF 148 and the AF 150, not shown), N6 (between the UPF 134 and the DN 152), N7 (between the SMF 136 and the PCF 148, not shown). N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
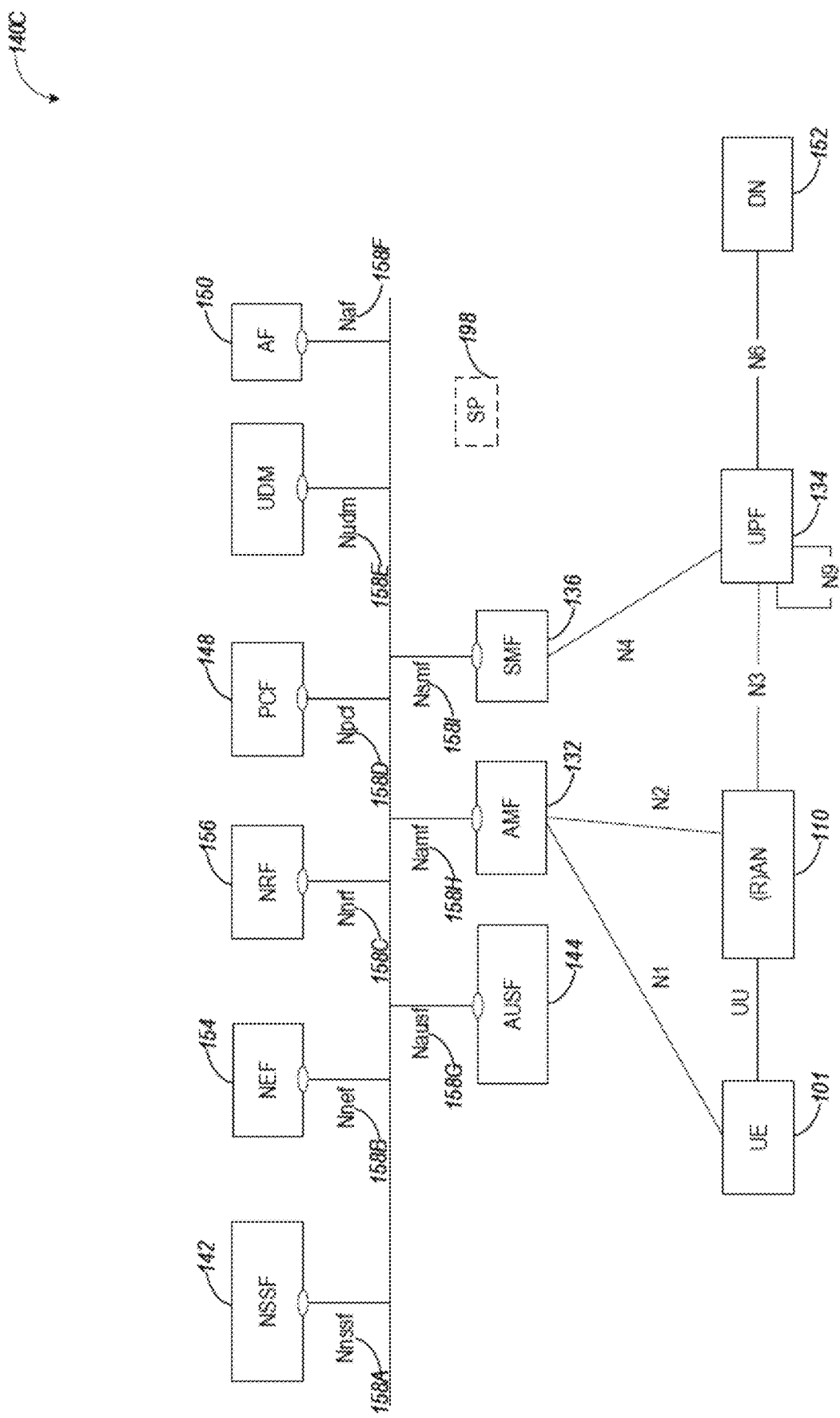
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142). Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
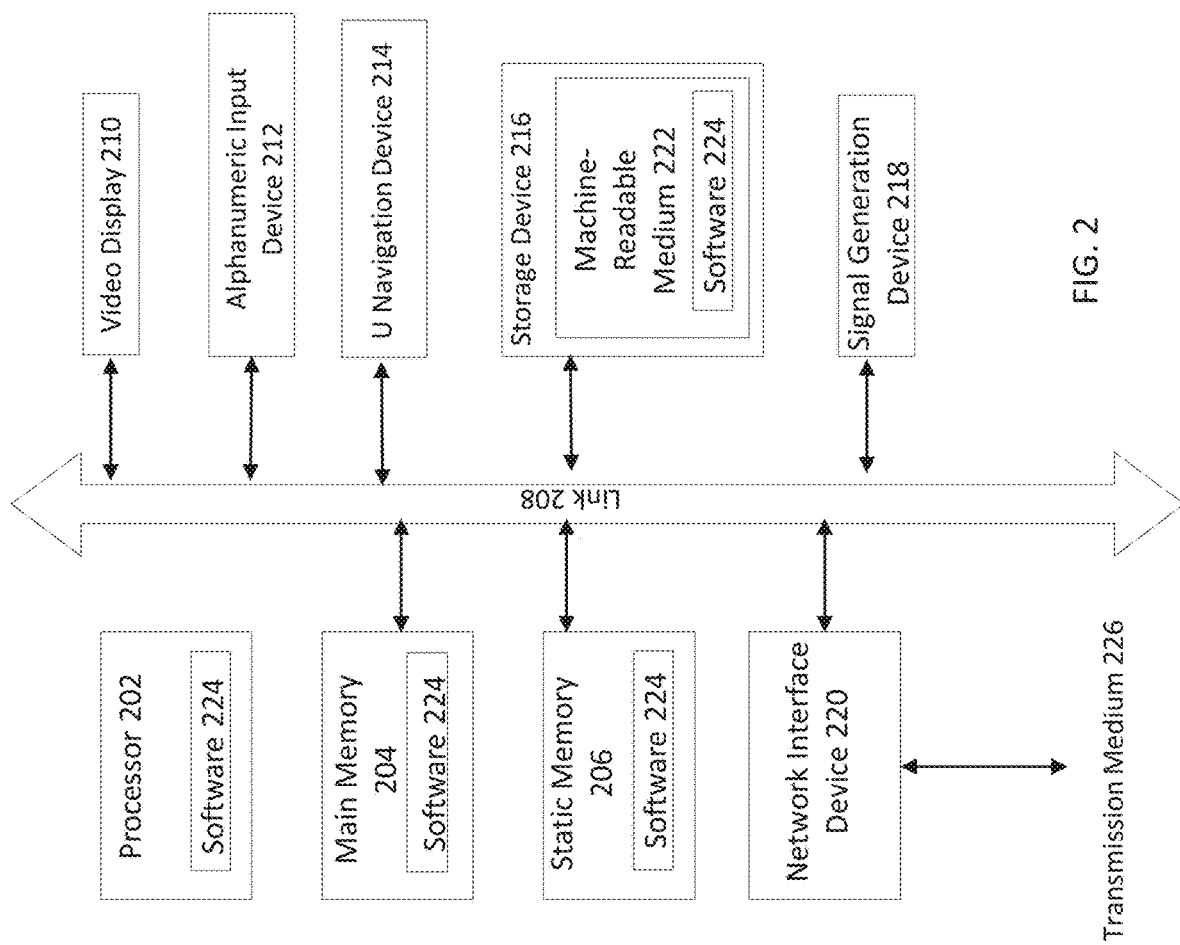
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices: magnetic disks, such as internal hard disks and removable disks; magneto-optical disks: Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Figure 3:
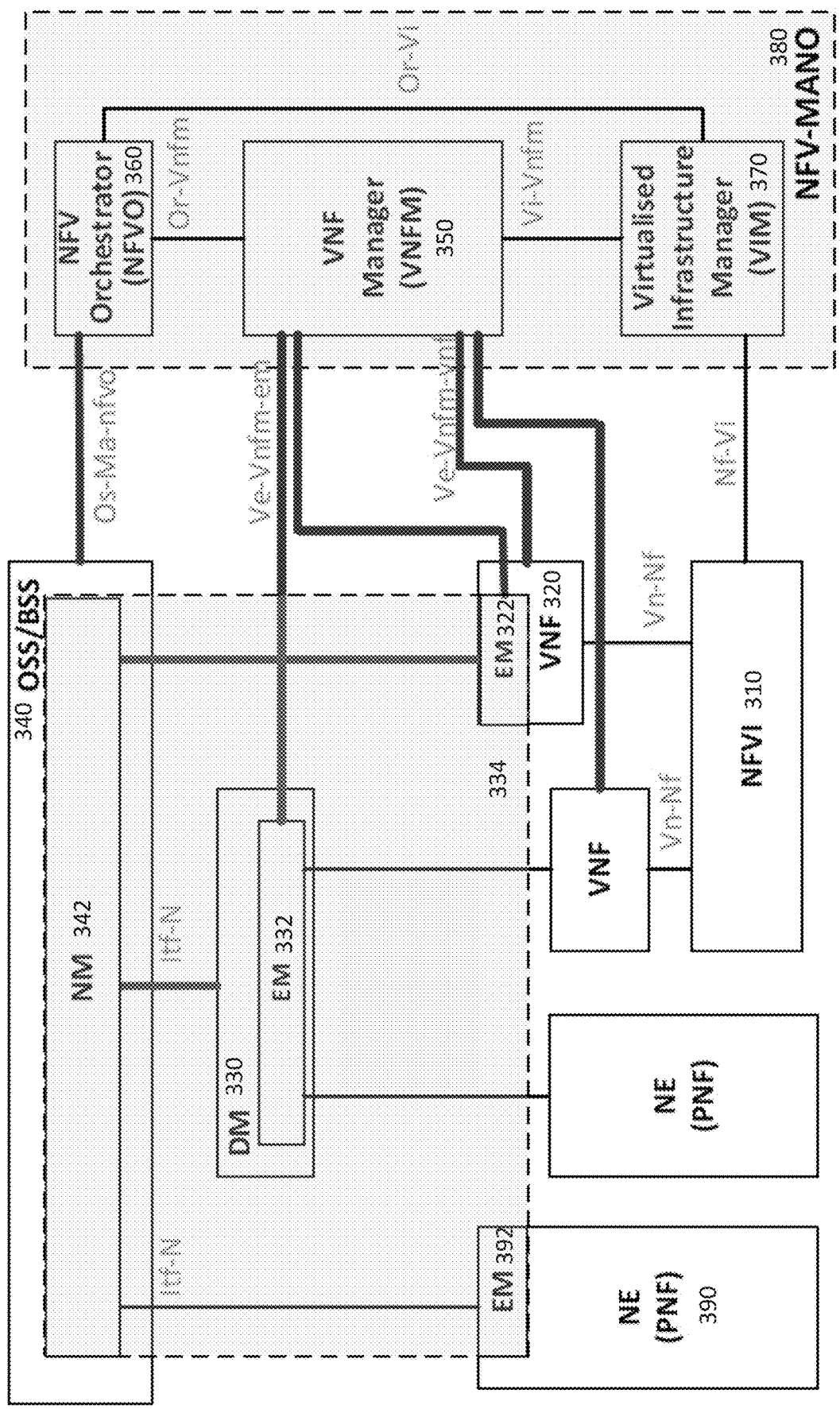
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Function Virtualization Infrastructure (NFVI) 310. Network elements (NEs) 390, Virtual Network Functions (VNFs) 310, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANOs, may comprise a Virtualized Infrastructure Manager (VIM) 370, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 334.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 310 may be instantiated in one or more servers. Each of the VNFs 310, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 310 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VNFM 350 and the EMs and NM. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM-EM reference point. The VNFM 350 may be assigned the management of a single VNF 320, or the management of multiple VNFs 310 of the same type or of different types. Thus, although only one VNFM 350 is shown in FIG. 3, different VNFMs 350 may be associated with the different VNFs 310 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operators Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) that may provide computational abilities (CPU), one or more memories that may provide storage at either block or file-system level and one or more networking elements that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 310 can be chained with other VNFs 310 and/or other physical network function to realize a network service. The virtualized resources may provide the VNFs 310 with desired resources. Resource allocation in the NFVI 310 may simultaneously meet numerous requirements and constraints, such as low latency or high bandwidth links to other communication endpoints.

The VNFs 310, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

As above, the various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Vi-Vnfm interface may implement a virtualized resource performance/fault management on the Vi-Vnfm reference point.

As above, with the advent of 5G networks and disparate devices (such as Machine Type Communication (MTC), enhanced Mobile Broadband (eMBB) and Ultra-Reliable and Low Latency Communications (URLLC) devices) using these networks, network management and network slicing is evolving towards a service-based architecture in which virtualization is used.

Network slicing is a form of virtualization that allows multiple virtual networks to run on top of a common shared physical network infrastructure. Network slicing serves service requirements by providing isolation between network resources, as well as permitting an optimized topology and specific configuration to be developed for each Network Slice Instance (NSI). The different parts of an NSI may be grouped as Network Slice Subnets that allow the lifecycle of a Network Slice Subnet Instance (NSSI) to be managed independently from the lifecycle of an NSI. The NSSIs may be implemented as different core networks, such RAN and 5GC.

Some of the above services have ultra-low latency, high data capacity, and strict reliability requirements, as any faults or performance issues in the networks can cause service failure, which may result in property damage and body injury. Therefore, it may be beneficial to collect real-time performance data that can be used by analytic applications (e.g., network optimization, self-organizing network (SON), etc.) to detect the potential issues in advance, and take appropriate actions to prevent or mitigate issues. Multiple analytic applications are capable of consuming performance data for specific purposes.

As above, the raw performance data of NFs of a mobile network can be analyzed, alone or together with other management data (e.g., alarm information, configuration data, etc.), and formed into one or more management analytical data for NFs, sub-networks, NSSIs or NSIs. The management analytical data can be used to diagnose ongoing issues impacting the performance of the mobile network and predict any potential issues (e.g., potential failure and/or performance degradation). For example, the analysis of NSI/NSSI resource usage can form a management analytical data indicating whether a certain resource is deteriorating. The analysis and correlation of the overall performance data of mobile network may indicate overload situation and potential failure(s).

A number of performance data streaming operations have been defined in 3GPP TS 28.532. However, the manner in which performance data streaming procedures in connection with measurement collection creation and termination are missing for: establishStreamingConnection; terminateStreamingConnection; reportStreamData; getStreamInfo; addStreamInfo; updateStreamInfo; deleteStreamInfo. Without these procedures, incorrect implementations of the performance data streaming feature may occur.

Figure 4:
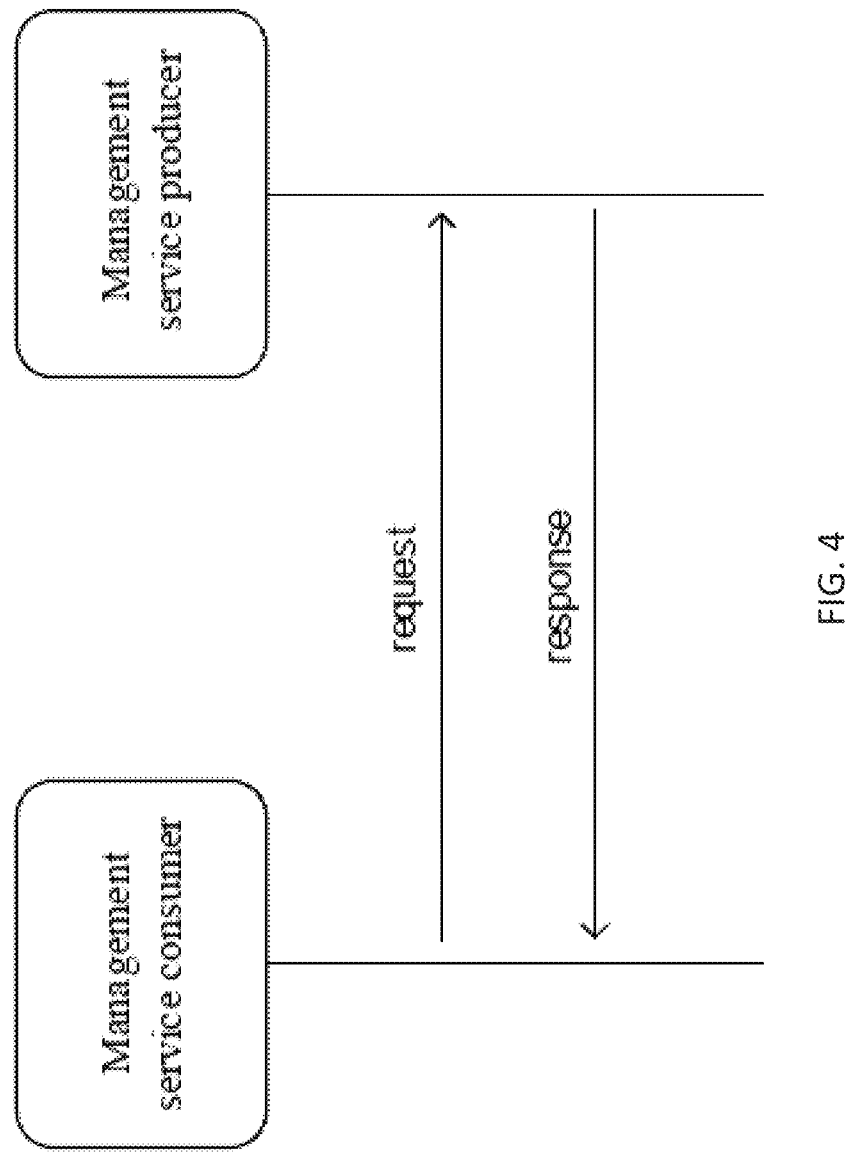
FIG. 4 illustrates general communications between a management service consumer and producer in accordance with some embodiments.

The following paradigms of interaction between a Management Service (MnS) producer and MnS consumer are defined in TS 28.533:

"Request-response": A management service producer is requested by a management service consumer to invoke an operation, which performs an action and/or provides information. The management service producer provides response based on the request by management service consumer. FIG. 4 illustrates general communications between a management service consumer and producer in accordance with some embodiments.

Figure 5:
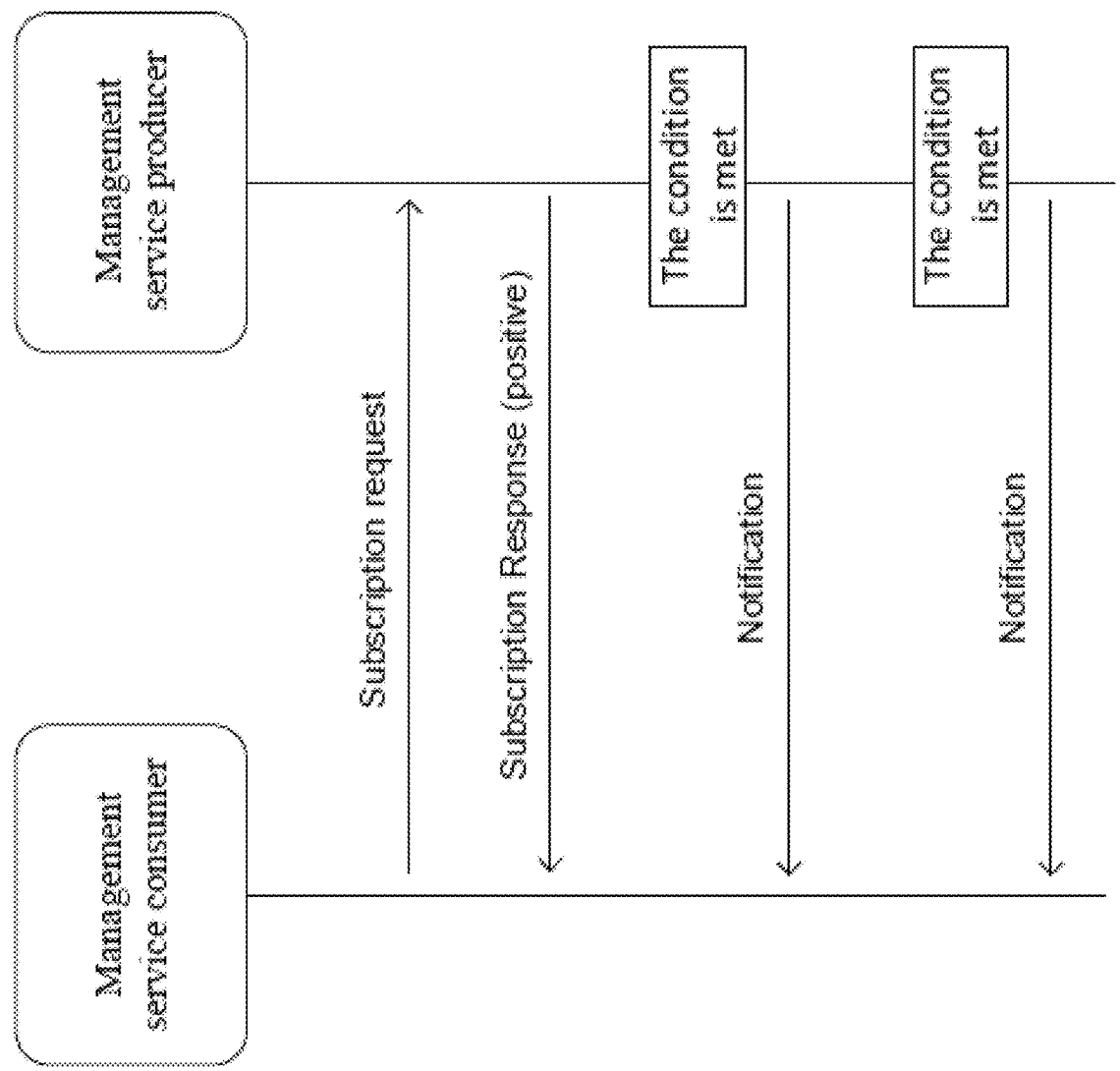
FIG. 5 illustrates subscription communications between a management service consumer and producer in accordance with some embodiments.

"Subscribe-notify": A management service consumer requests a management service producer to establish a subscription to receive network events via notifications, under the filter constraint specified in this operation. Subscriptions can be created also by other means than by using such an operation. FIG. 5 illustrates subscription communications between a management service consumer and producer in accordance with some embodiments.

One example of a common aspect applicable to all management services is the use of notifications. For a management service to use notifications, the management service consumer has a subscription to notifications it is interested in. The management service consumer requests the creation of a subscription by sending a subscribe operation to the management service producer. To cancel a subscription, the consumer sends an unsubscribe operation to the producer.

However, the above paradigms may be unable to support management data streaming (performance data streaming, streaming based trace reporting). Accordingly, embodiments herein provide definitions of procedures for the paradigm and procedure for performance data streaming. Performance data streaming promotes a data centric approach.

1. Paradigm of Interaction Between MnS Producer and MnS Consumer for Streaming

Figure 6:
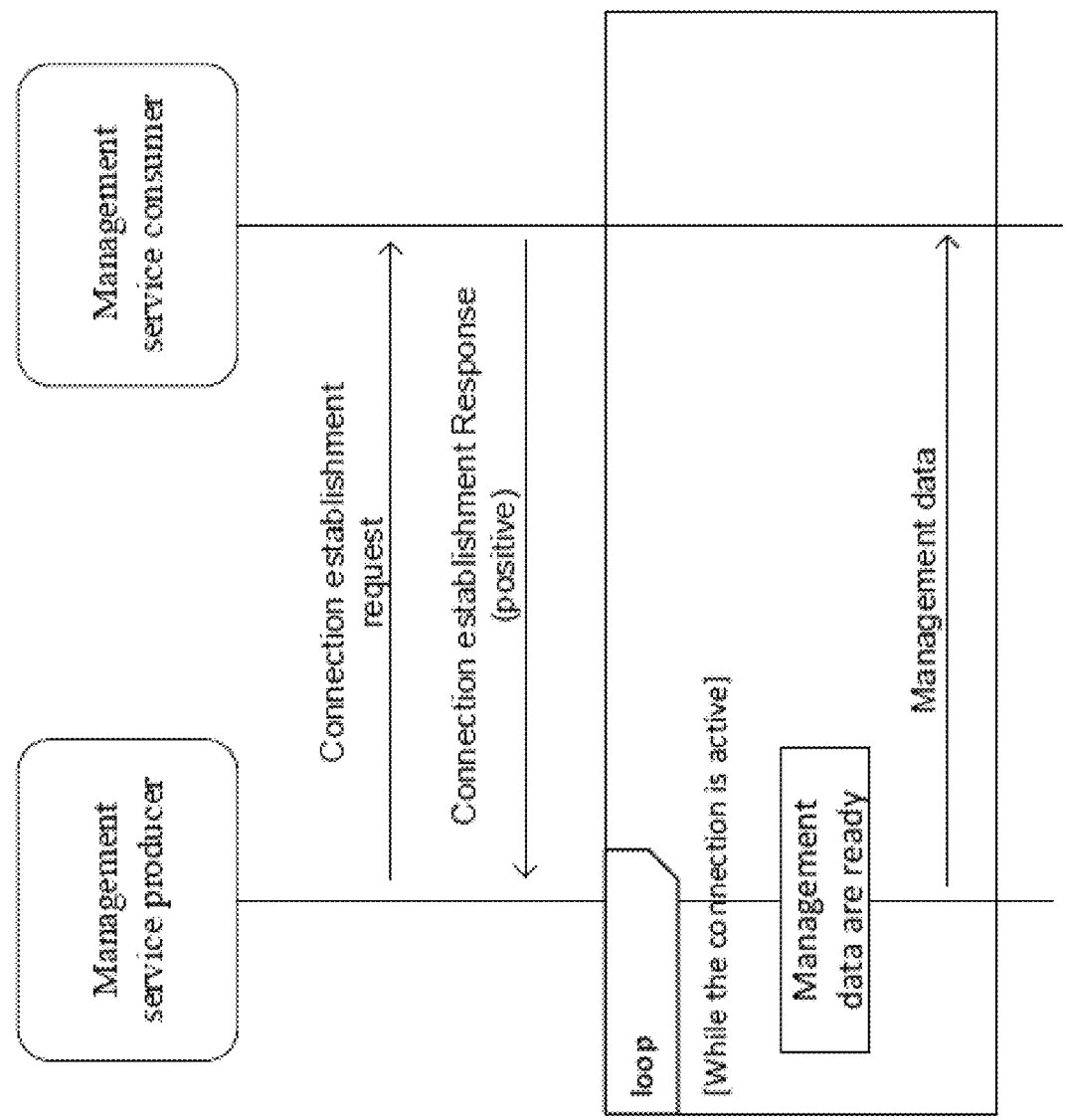
FIG. 6 illustrates streaming communications between a management service consumer and producer in accordance with some embodiments.

The following paradigm is added for interactions between the management service producer and management service consumer for management data streaming:

"Connect-streaming": A management service producer requests to establish a connection with the management service consumer for management data streaming. The management service producer sends the management data, when the data is ready, by streaming to the management service consumer over an established connection. FIG. 6 illustrates streaming communications between a management service consumer and producer in accordance with some embodiments.

2. Procedures for Performance Data Streaming

D.1 Performance Data Streaming for Starting Measurement Collection

D.1.1 Sequence Flow

Figure 7:
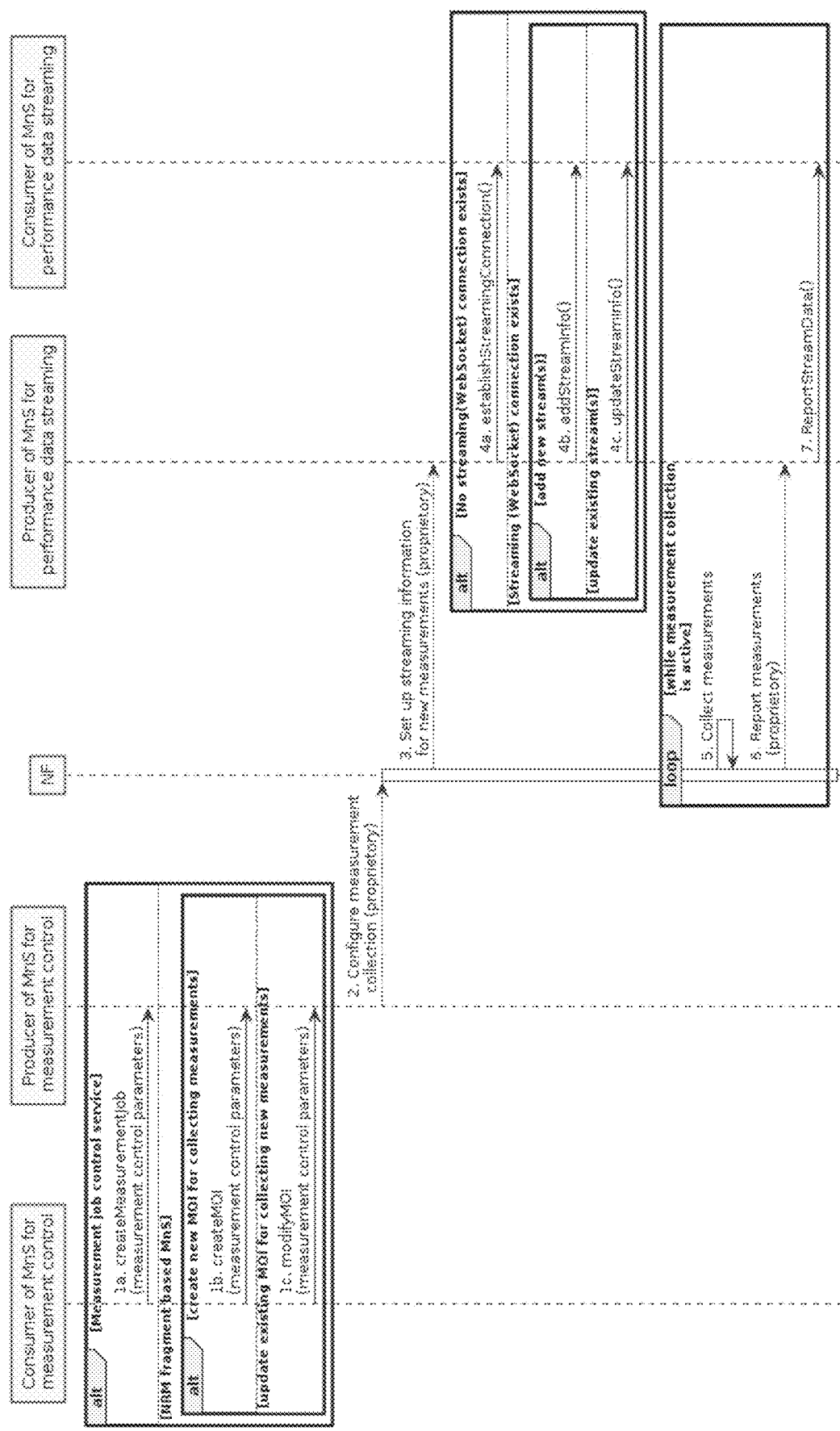
FIG. 7 illustrates performance data streaming for starting measurement collection in accordance with some embodiments.

This annex shows the holistic sequence for performance data streaming, starting from starting the measurement collection (by job or configuration) to sending the performance data to the performance data streaming consumer (stream target). FIG. 7 illustrates performance data streaming for starting measurement collection in accordance with some embodiments. In FIG. 7:

1. The consumer of MnS for measurement control requests the MnS producer to start measurement collection by the following alternatives:
   1a. consuming the measurement job control service to create a measurement job, by invoking a createMeasurementJob operation:
   1b. consuming a network resource model (NRM) fragment-based measurement control service to create a new management object instance (MOI) (e.g., MOI of a MeasurementReader information object class (IOC)) for collecting the measurements by invoking a createMOI operation;
   1c. consuming a NRM fragment-based measurement control service to modify an MOI (e.g., MOI of a MeasurementReader TOC) to add new measurements to be collected, by invoking a modify MOI operation.
2. The producer of MnS for measurement control configures the NF to collect the measurements. The mechanism of this step is vendor specific. If the producer of MnS for measurement control is in the NF, this step can be skipped.
3. The NF triggers the producer of MnS for performance data streaming to set up the streaming information for the new measurements to be collected. The mechanism of this step is vendor specific. If producer of MnS for performance data streaming is in the NF, this step can be skipped.
4. The producer of MnS for performance data streaming communicates with the consumer to:
   4a. establish a streaming (WebSocket) connection containing the stream information if the connection does not exist yet by invoking the establishStreamingConnection operation;
   4b. add the stream information for the new measurements, if the new measurements are to be reported by new streams, by invoking the addStreamInfo operation;
   4c. update the stream information for the new measurements, if the new measurements are to be reported by existing streams, by invoking the updateStreamInfo operation.
5. The NF collects the measurements. This step is the internal behavior of the NF.
6. The NF reports the collected measurements to the producer of MnS for performance data streaming. The mechanism of this step is vendor specific. If the producer of MnS for performance data streaming is in the NF, this step can be skipped.

7. The producer of MnS for performance data streaming sends the collected measurements to the consumer via performance data streams by invoking the reportStreamData operation.

D.x Performance Data Streaming for Stopping Measurement Collection

D.x.1 Sequence Flow

Figure 8:
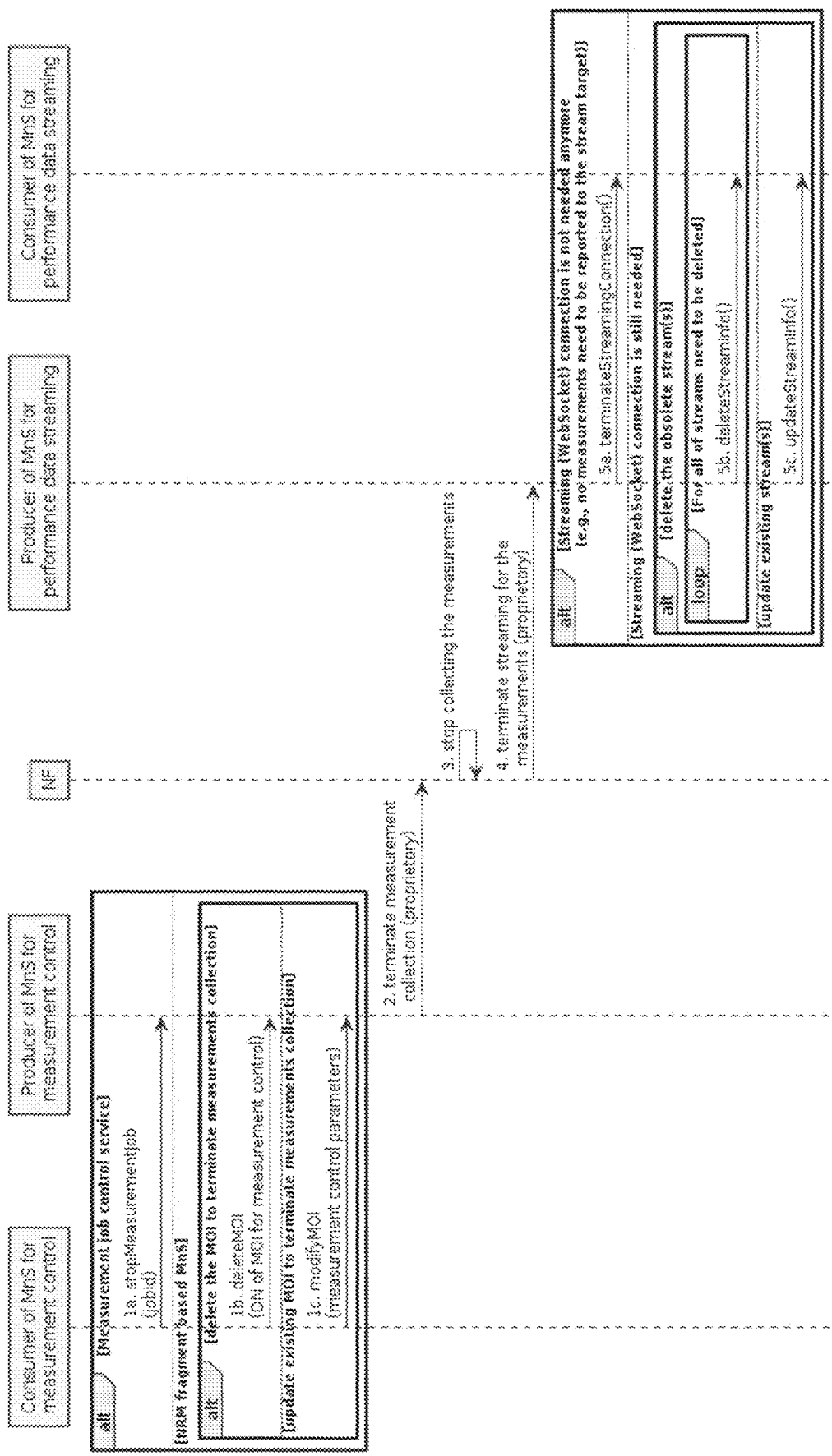
FIG. 8 illustrates performance data streaming for stopping measurement collection in accordance with some embodiments.

This annex shows the holistic sequence for performance data streaming in connection with the measurement collection termination. FIG. 8 illustrates performance data streaming for stopping measurement collection in accordance with some embodiments. In FIG. 8:

1. The consumer of MnS for measurement control requests the MnS producer to stop the measurement collection by the following alternatives:

1a. consuming the measurement job control service to create a measurement job by invoking the stopMeasurementJob operation;

1b. consuming an NRM fragment-based measurement control service to delete an MOI (e.g., MOI of MeasurementReader IOC) for terminating the measurements collection, by invoking the deleteMOI operation;

1c. consuming an NRM fragment-based measurement control service to modify an MOI (e.g., MO of MeasurementReader IOC) with deletion of the measurements that are not to be collected anymore, by invoking the modifyMOI operation.

2. The producer of MnS for measurement control requests the NF to stop collecting the measurements. The mechanism of this step is vendor specific. If producer of MnS for measurement control is in the NF, this step can be skipped.

3. The NF stops collecting the measurements. This step is the internal behavior of the NF.

4. The NF triggers the producer of MnS for performance data streaming to terminate streaming for the measurements. The mechanism of this step is vendor specific. If producer of MnS for performance data streaming is in the NF, this step can be skipped.

5. The producer of MnS for performance data streaming communicates with the consumer to:

5a. terminate the streaming (WebSocket) connection if no measurements are to be reported to the consumer anymore, by invoking the terminateStreamingConnection operation;

5b. delete the information for the stream(s) obsoleted due to the termination of the measurements collection if the streaming connection is still to be retained, by invoking the deleteStreamInfo operation (i.e., the streaming connection is still to be used, but one or more of the streams are to be deleted as no other data is to be transmitted on those streams);

5c. update the information for the stream(s) partially affected by the termination of the measurements collection, by invoking the updateStreamInfo operation (i.e., the streaming connection is still to be used, and all of the streams are still in operation no other data is to be transmitted on each of those streams).

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although an embodiment has been described with reference to specific example embodiments, it is evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising processing circuitry and memory configured to operate as a Management Service (MnS) producer for measurement control in a new radio (NR) network, wherein:
the processing circuitry configures the MnS producer to:
receive, from an MnS consumer, a request to start measurement collection to collect performance measurements; and
in response to reception of the request, configure a network function (NF) to:
trigger a producer of MnS for performance data streaming to set up, with a consumer of MnS for performance data streaming, streaming information for the performance measurements to be collected;
start the measurement collection; and
report the performance measurements to the producer of MnS for performance data streaming for the producer of MnS for performance data streaming to send to the consumer of MnS for performance data streaming via a streaming connection that includes at least one performance data stream; and
the memory is configured to store the request.

2. The apparatus of claim 1, wherein the request to start the measurement collection is indicated via a createMeasurementJob operation.

3. The apparatus of claim 1, wherein the request to start the measurement collection is indicated via a createMOI operation to create a new managed object instance (MOI) of information object class (IOC).

4. The apparatus of claim 1, wherein the request to start the measurement collection is indicated via a modifyMOI operation to modify a managed object instance (MOI) of information object class (IOC) with attributes indicating the performance measurements to be collected.

5. The apparatus of claim 1, wherein the processing circuitry further configures the MnS producer to:
receive a request from the MnS consumer to stop the measurement collection; and
configure the NF to stop collection of the performance measurements and to trigger the producer of MnS for performance data streaming to stop streaming of the performance measurements.

6. The apparatus of claim 5, wherein the request to stop the measurement collection is indicated via a stopMeasurementJob operation.

7. The apparatus of claim 5, wherein the request to stop the measurement collection is indicated via a deleteMOI operation to delete an existing managed object instance (MOI) of information object class (IOC).

8. The apparatus of claim 5, wherein the request to stop the measurement collection is indicated via a modifyMOI operation to modify a managed object instance (MOI) of information object class (IOC) with deletion of the performance measurements that are no longer to be collected.

9. An apparatus comprising processing circuitry and memory configured to operate as a Management Service (MnS) producer for performance data streaming in a new radio (NR) network, wherein:
the processing circuitry configures the MnS producer to:
receive, from a network function (NF), a request to set up streaming information for new performance measurements to be collected using a streaming connection, the streaming connection containing one or more streams;
in response to reception of the request to set up the streaming information,
establish, with an MnS consumer for performance data streaming, the streaming connection containing the streaming information in response to determination that the streaming connection does not exist;
add the streaming information for the new performance measurements in response to determination that the streaming connection exists and that the new performance measurements are to be reported by new streams; and
update existing streaming information with the streaming information for the new performance measurements in response to determination that the streaming connection exists and that the new performance measurements are to be reported by existing streams; and
the memory is configured to store the request to set up the streaming information.

10. The apparatus of claim 9, wherein to establish the streaming connection, the processing circuitry further configures the MnS producer to invoke an establishStreamingConnection operation.

11. The apparatus of claim 9, wherein the processing circuitry further configures the MnS producer to:
invoke an addStreamInfo operation to add the streaming information; and
invoke an updateStreamInfo operation to update the existing streaming information.

12. The apparatus of claim 9, wherein the processing circuitry further configures the MnS producer to:
receive a measurement report from the NF; and
send, to the MnS consumer for performance data streaming, performance measurement data of the measurement report via a performance data stream.

13. The apparatus of claim 12, wherein the processing circuitry further configures the MnS producer to invoke a reportStreamData operation to send the performance measurement data to the MnS consumer.

14. The apparatus of claim 9, wherein the processing circuitry further configures the MnS producer to:
receive a request from the NF to terminate streaming of the new performance measurements; and
communicate with the MnS consumer in response to reception of the request to terminate streaming of the new performance measurements to:
terminate the streaming connection in response to a determination that no measurements provided by the streaming connection are to be reported;
delete the streaming information for the new performance measurements in response to a determination that other measurements provided by the streaming connection are to be reported and at least one stream of the one or more streams is to be deleted by termination of streaming of the new performance measurements; and
update the streaming information for the new performance measurements in response to the determination that other measurements provided by the streaming connection are to be reported and at least one stream of the one or more streams is to be partially affected by termination of streaming of the new performance measurements.

15. The apparatus of claim 14, wherein the processing circuitry further configures the MnS producer to invoke an updateStreamInfo operation to update the streaming information for the new performance measurements.

16. The apparatus of claim 14, wherein the processing circuitry further configures the MnS producer to invoke a terminateStreamingConnection operation to terminate the streaming connection.

17. The apparatus of claim 14, wherein the processing circuitry further configures the MnS producer to invoke a deleteStreamInfo operation to delete the streaming information for the new performance measurements.

18. A non-transitory computer-readable storage medium that stores instructions for execution by one or more processors configured to operate as a Management Service (MnS) producer for performance data streaming in a new radio (NR) network, the instructions when executed configure the one or more processors to configure the MnS producer to:

receive, from a network function (NF), a request to set up streaming information for new performance measurements to be collected using a streaming connection, the streaming connection containing one or more streams;

in response to reception of the request:

establish, with an MnS consumer for performance data streaming, the streaming connection for performance data streaming in response to determination that the streaming connection does not exist;

add the streaming information for the new performance measurements in response to determination that the streaming connection exists and that the new performance measurements are to be reported by new streams; and update existing streaming information with the streaming information in response to determination that the streaming connection exists and that the new performance measurements are to be reported by existing streams.

19. The medium of claim 18, wherein the instructions, when executed by the one or more processors, further configure the MnS producer to:

receive a request from the NF to terminate streaming of the new performance measurements; and communicate with the MnS consumer in response to reception of the request to terminate streaming of the new performance measurements to:

terminate the streaming connection in response to a determination that no measurements provided by the streaming connection are to be reported;

delete the streaming information for the new performance measurements in response to a determination that other measurements provided by the streaming connection are to be reported and at least one stream of the one or more streams is to be deleted by termination of streaming of the new performance measurements; and update the streaming information for the new performance measurements in response to the determination that other measurements provided by the streaming connection are to be reported and at least one stream of the one or more streams is to be partially affected by termination of streaming of the new performance measurements.

20. The medium of claim 18, wherein the instructions, when executed by the one or more processors, further configure the MnS producer to invoke:

an updateStreamInfo operation to update the streaming information for the new performance measurements, a terminateStreamingConnection operation to terminate the streaming connection, and a deleteStreamInfo operation to delete the streaming information for the new performance measurements.

* * * * *